US007069325B1

(12) United States Patent
Lu et al.

(10) Patent No.: US 7,069,325 B1
(45) Date of Patent: Jun. 27, 2006

(54) METHOD AND APPARATUS FOR HANDLING REQUESTS IN A NETWORK

(75) Inventors: Gang Lu, Framingham, MA (US); James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 746 days.

(21) Appl. No.: 10/034,289

(22) Filed: Dec. 21, 2001

(51) Int. Cl.
*G06F 15/173* (2006.01)

(52) U.S. Cl. ................ 709/226; 709/217; 709/223; 709/224; 709/227; 709/248

(58) Field of Classification Search ........ 709/203–208, 709/213–219, 231, 232, 234, 239, 248, 235, 709/238, 223, 224, 226, 227
See application file for complete search history.

(56) References Cited

U.S. PATENT DOCUMENTS

| 6,052,718 | A  | * | 4/2000  | Gifford ..................... 709/219 |
| 6,185,598 | B1 | * | 2/2001  | Farber et al. ............... 709/200 |
| 6,247,058 | B1 | * | 6/2001  | Miller et al. ................ 709/234 |
| 6,298,381 | B1 | * | 10/2001 | Shah et al. .................. 709/228 |
| 6,304,913 | B1 | * | 10/2001 | Rune .......................... 709/241 |
| 6,453,356 | B1 | * | 9/2002  | Sheard et al. ............... 709/231 |
| 6,598,077 | B1 | * | 7/2003  | Primak et al. .............. 709/219 |
| 6,640,239 | B1 | * | 10/2003 | Gidwani ..................... 709/203 |
| 6,654,807 | B1 | * | 11/2003 | Farber et al. ............... 709/225 |
| 6,718,361 | B1 | * | 4/2004  | Basani et al. ............... 709/201 |
| 6,718,396 | B1 | * | 4/2004  | Maejima et al. ............ 709/249 |
| 6,724,733 | B1 | * | 4/2004  | Schuba et al. .............. 370/252 |
| 6,748,447 | B1 | * | 6/2004  | Basani et al. ............... 709/244 |
| 6,754,699 | B1 | * | 6/2004  | Swildens et al. ........... 709/217 |
| 6,795,860 | B1 | * | 9/2004  | Shah .......................... 709/229 |
| 6,857,012 | B1 | * | 2/2005  | Sim et al. ................... 709/222 |
| 2002/0078174 | A1 | * | 6/2002 | Sim et al. ................... 709/219 |
| 2002/0083187 | A1 | * | 6/2002 | Sim et al. ................... 709/235 |
| 2002/0112036 | A1 | * | 8/2002 | Bohannon et al. .......... 709/220 |
| 2003/0046369 | A1 | * | 3/2003 | Sim et al. ................... 709/220 |

\* cited by examiner

*Primary Examiner*—Saleh Najjar
*Assistant Examiner*—V. Korobov
(74) *Attorney, Agent, or Firm*—Chapin Ip Law, LLC; Barry W. Chapin, Esq.

(57) ABSTRACT

The invention is directed to techniques for synchronizing a plurality of servers, receiving a client request from the client to access a server of the plurality of servers, generating a transmit identifier associated with the client request, the transmit identifier identifying an event upon the occurrence of which the plurality of synchronized servers each transmit a response to the client, forwarding the client request and the transmit identifier to each of the plurality of synchronized servers. The invention is also directed to techniques and mechanisms for receiving a client request associated with a client and receiving a transmit identifier identifying an event, generating a response to the client request, and transmitting the response to the client upon an occurrence of the event identified by the transmit identifier.

21 Claims, 6 Drawing Sheets

METHOD AND APPARATUS FOR HANDLING REQUESTS IN A NETWORK

BACKGROUND OF THE INVENTION

Computer networks like the Internet can be used to provide a variety of content in response to user and other requests for the content over a complex system of interconnecting content sources dispersed over widespread geographic locations. The complexity of such networks, combined with an explosive volume of information being made available, has resulted in the development of techniques and systems that are designed to address the management of network and server traffic made up of such requests.

In order to provide for effective delivery of Internet content in response to user requests, content may be simultaneously stored by multiple content servers dispersed throughout the network. Conventional methods and systems exist to direct user requests for the content or other data to the most effective server for providing the content from among the available alternative servers that are each capable of delivering the requested content. One reason for the existence of these methods and systems is that network topologies change on a regular basis. New network nodes can be added, removed and changed, etc., potentially impacting the availability or desirability of a particular communications path. Also, the desirability of any communications path may be changed as a factor of the volume of requests being directed to a particular server or over a network node at any time. For example, public events may cause the content stored on a particular content source to be in great demand thereby increasing the volume of requests directed to the source and the volume of communications handled by the network facilities connected to that source. Other factors, such as time zone changes, other traffic and workload factors, etc. may also impact any content source and/or its related network facilities' response times.

Certain conventional network devices are designed to direct requests for content concurrently to multiple locations. An attempt is made to reduce the time element for requests to travel from the requesting network device to the content sources. When the requests are received by the multiple content sources to which they were directed, the content is sent from the multiple content sources to the client originating the request. The requesting client, accordingly, accepts the communication which arrives first and ignores the later transmissions.

SUMMARY OF THE INVENTION

Unfortunately, there are shortcomings to the conventional method for attempting to choose the fastest server or most optimal network route and to deliver requested content to a client from alternative servers (e.g., slave servers) in response to a request for such content. In particular, one method uses a main server to forward a client request initially directed to the main server to multiple duplicate servers in response to the client request. In other words, the main server receives the initial client request and forwards the initial client request to duplicate servers that each might be capable of handling the client request. The duplicate servers each respond by returning a response for the requested content to the client and the client accepts the first transmission received from one of the duplicate servers and rejects later duplicate transmissions from the other duplicate servers. However, using conventional techniques, choosing the duplicate server whose response reaches the requesting client first does not guarantee that a response for the requested content from the fastest duplicate server has been identified. For example, if a duplicate server is located far from a main server, it may take a long time for a client-initiated request to travel from the main server to the duplicate server, even though the duplicate server could actually be the fastest (e.g., the duplicate server that is closest to the client and/or fastest at processing and transmitting the requested content to the client) duplicate server. This can occur because a client request has to travel from the main server to the duplicate server before the duplicate server sends the content to the client; the time required for fulfilling the client request includes the time for both transmission legs rather than just the time needed for a client request to reach the client from the duplicate server. As a consequence, using conventional server selection techniques to select a duplicate server to provide content based on the first response received by the client might not necessarily result in choosing the duplicate server that is able to deliver content to the client the fastest.

As a result of this phenomenon, selection of the fastest duplicate server is not always accurate using conventional techniques. In some cases, the effect of a long transmission time between a particular main server and duplicate server may cause the slave server to be routinely eliminated from contention to deliver a response first to a client. For example, it is possible that due to the existence of a long transmission time between the main server and a particular duplicate server, that the client request, sent from the main server, does not even reach the slave server until after the client has already received a requested response from another duplicate server. As stated earlier, this situation can occur, even if a particular duplicate server is the best choice for delivering content in response to a client request as a result of the duplicate server being close to the client (e.g., as stated earlier, this result can occur due to the duplicate server being located far from the main server).

Network designers can improve the accuracy of identifying the fastest server using conventional techniques by estimating the time for transmission between a main server and each individual duplicate server and attempting to adjust or delay the timing between the transmission of forwarded client content requests to the duplicate servers so as to adjust the total travel time for client requests and thereby reduce the effect of different transmission times to the different duplicate servers. As an example, using conventional techniques, a main server may briefly delay forwarding a client request for one nearby duplicate server to allow time for an already forwarded client request to reach a far-away duplicate server in an attempt to allow each duplicate server (i.e., the forwarding and the nearby duplicate servers) to respond at approximately the same time to the forwarded client request.

Network designers can estimate maximum transmission times between the main server and duplicate servers in order to attempt to calculate appropriate delay times for some servers and reduce the likelihood that any duplicate server would have insufficient time to transmit a response to requested content to the client and thereby be eliminated from contention between the duplicate servers. Accordingly, the duplicate servers are configured to send requested content to the client after the approximated delay has transpired However, conventional techniques identifying request delivery times (i.e., delays) between the main server and duplicate servers are an approximation. Some conventional systems are set up to calculate the transmission times between the main server and duplicate servers by configuring the main server to send a test transmission to each duplicate server that is immediately returned back to the main server. Upon the test transmission's return to the main server, the two-way travel time is calculated and divided by two (e.g., in order to estimate the average transmission time for transmission in one direction) thereby approximating the delivery time from the main server to each duplicate server. While this conventional method can improve upon selection of forwarded request delay times and thus can be used to adjust the total time for a forwarded client request to reach each duplicate server and the content be sent to the client, the resulting delivery time is an estimation and still suffers from inaccuracy. That is, the inaccuracy exists due to the fact that transmission paths over a network may not be the same in both directions or may change and, as a result, the estimated forwarded request delivery time may not be an accurate estimation of the actual forwarded request transmission time.

Another problem with the conventional technique of using different delay times as a way to adjust request delivery time such that each duplicate server can respond to a client at the same time is that delivery times can vary over a period of time (e.g., network facilities may change, workload may change, other factors may affect delivery times). As a result, conventional duplicate server selection (e.g., based on the client accepting the first content response received) based on pre-calculated delays is susceptible to inaccuracies. Furthermore, the conventional method of calculating and using different delay times results in the burden on computing resources of additional overhead for each transmission link in order to perform such processing.

Embodiments of the invention are directed to methods and mechanisms that improve the accuracy of calculating and using delay times and, as a result, significantly improve the accuracy of selection of an optional (i.e., a fastest) slave server to respond to a client requesting content. In an example embodiment of the invention, upon receipt of a request for content from a client, a main server timestamps the arrival time of a client request for content. The timestamp serves as a basis for a transmit identifier that can be used later by one or more slave servers to know when to initiate delivery of a content response to the requesting client. In some cases, the main server may use timestamps other than the timestamp of the client request arrival in order to create the transmit identifier. For example, the timestamp of the time of processing the request, or of the time that the client request enters or exits a queue before processing, or the time of actually forwarding the request, etc. can be used to produce a transmit identifier.

In one embodiment of the invention, both the master server and slave servers are synchronized using any one or more of a variety of methods such as a NTP (network time protocol), GPS (global positioning system), clock times distributed by cell phone, television/radio signals, or other synchronization methods, etc. that tightly time-couple the master server and slave servers to each other.

The master server can calculate a predetermined delay time, or utilizes a fixed delay time as a predetermined delay time for use in producing the transmit identifier. The master server can use one of many different methods to arrive at a predetermined delay time. One method is to compute a predetermined delay that is based on the maximum delivery time for delivering content from the master server to one or more of the slave servers. Another method is to use a mathematical distribution or formula, or an actual network transmission test or other known traffic information to derive a predetermined delay that is, depending upon the embodiment, less than, equal to, or greater than the maximum delivery time of information from the master server to one or more of the slave servers. Other methods to establish a predetermined delay upon which transmit identifiers can be based can also be used.

Both the timestamp and the predetermined delay are used to create, calculate, determine, compute or otherwise derive a transmit identifier. In turn, the master server forwards the transmit identifier to slave servers, where the individual slave servers use the transmit identifier as the starting time to deliver content, in response to receiving a forwarded client request associated with the transmit identifier, to the requesting client. Accordingly, the slave servers are able to send requested content responses to the client starting at the same starting time, more accurately than is possible using conventional methods.

As a consequence of this procedure the slave servers can more precisely generate simultaneous delivery of responses for requested content from different slave servers to the client, and clients can use one slave server's ability to be the first to deliver requested content to the client as an accurate predictor of the fastest slave server. As such, the embodiments of the invention are better able to guarantee delivery of content using an optimal (i.e., the fastest) slave server.

Once the preferred path for communications between the client and server has been established, the client may be bound to the identified fastest server for transmission of request responses, during a limited time period. Accordingly, the same path may be relied on for further responses either as a result of the initial request or in response to additional requests, as well. In other situations, the identified slave server may not necessarily be used to respond to client requests. In one case, for example, the identified slave server may be a special purpose server that is representing a particular site, cluster, or group, etc. of servers from which the client will actually be served.

In one embodiment of the invention, a plurality of servers are synchronized and one server (e.g., a master serve) receives a client request from the client to access a server of the plurality of servers. The embodiment then generates a transmit identifier associated with the client request. The transmit identifier identifies an event upon the occurrence of which the plurality of synchronized servers each transmit a response to the client. The embodiment then forwards the client request and the transmit identifier to each of the plurality of synchronized servers. This embodiment of the invention thus provides an improvement for causing multiple slave servers to transmit requested content to a client at the same time so that the content from the slave server, capable of transmitting the content to the client the fastest, will reach the client first.

In another embodiment, a server such as a master server or another mechanism synchronizes a clock mechanism in each of the plurality of servers. As a result of synchronizing all of the slave servers' synchronization clocks to the synchronization clock of the master server, the times provided by the synchronization clocks of the slave servers can be used to identify a time when a response to a client request can be transmitted from multiple servers simultaneously. The timing of receipt by the client of responses to the requested content is used to determine which is the most efficient slave server to provide the requested content.

In yet another embodiment, the server obtains a timestamp associated with the client request. The timestamp provides an initial starting point from which to calculate the actual time for transmission of a response to requested client content from multiple slave servers.

In another embodiment, the server (e.g., master server) adds a predetermined delay to the timestamp to produce the transmit identifier. The predetermined delay represents an additional time, after the time defined in the timestamp, that will transpire before each slave server produces a response to the requested content for transmission to the client. The predetermined delay may be chosen in such a way that the transmission time for a response from each server will increase the likelihood that the slave server which is able to transmit a response to the client more rapidly than other slave servers will be included in the "race" for sending responses to the requesting client. The predetermined delay selection may also take into consideration the actual time delay caused as a result of slave servers transmitting requested a response to a client after the predetermined delay has transpired.

In still another embodiment, the server associates the transmit identifier with the client request. This enables the slave server to use the transmit identifier as a basis to transmit requested responses according to the time that the predetermined delay specifies.

In another embodiment, the server combines the transmit identifier into the client request. This reduces the transmission capacity required to forward both client requests and transmit identifiers as well as the processing overhead required.

In another embodiment, the server obtains a timestamp upon receipt of the client request.

In yet another embodiment, the client request is received in a request queue, and obtaining the timestamp is performed at a time of processing the client request from the request queue.

In still another embodiment, the transmit identifier identifies an event indicating a future time within each of the plurality of servers at which each of the plurality of servers responds to the client request and the future time is related to a predetermined delay associated with at least one of the plurality of servers. Accordingly, the forwarded transmit identifier provides a mechanism for timing the transmission of requested content in conjunction with a future event such as, for example, synchronized clocks in each server all reaching a future transmit time specified by the transmit identifier.

In another embodiment, the predetermined delay is greater than a maximum transmission delay for transmission of the client request to one of the plurality of servers from a master server. Selection of a predetermined delay that is greater than the maximum transmission delay for client requests that are sent to a plurality of servers insures that all slave servers will have an opportunity to transmit a response to the client request such that all responses race to the client at the same time and one that can be received by the client before the client receives other responses from any of the other slave servers if one slave server is faster or has a more optimal network route to the client than the other slave servers.

In another embodiment, the predetermined delay is less than or equal to a maximum transmission delay for transmission of the client request to one of the plurality of servers from a master server. Use of a predetermined delay that is less than the maximum transmission delay permits the transmission of requested content within a timeframe that balances the likelihood of including the fastest available slave server against the actual transmission delay experienced as a result the delay time chosen.

In yet another embodiment, the server receives a client request associated with a client and receives a transmit identifier identifying an event, generates a response to the client request and transmits the response to the client upon an occurrence of the event identified by the transmit identifier.

In still another embodiment, the server accepts a time synchronization signal and synchronizes a clock based on the synchronization signal. Synchronization of the time clocks provides for a close coupling between the servers for timing of the activities undertaken by the servers and provides a mechanism that enable multiple slave servers to simultaneously transmit requested content to a client.

Other arrangements of embodiments of the invention that are disclosed herein include software programs to perform the method embodiment steps and operations summarized above and disclosed in detail below. As an example, a data communications device software control application, such as a data communications device operating system configured to operate as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other device to cause such a device to perform the techniques explained herein as embodiments of the invention.

Embodiments of the invention also include computer program products such as disks, or other readable media that have a computer-readable medium including computer program logic encoded thereon for controlling transmission of content requests between the master and slave servers and slave servers' response to a client request for content in a networked computer environment, such that the computer program logic, when executed on at least one processing unit with the computerized device, causes the at least one processing unit to perform any or all of the aforementioned methods.

The methods embodiments of the invention may be implemented by computer software and/or hardware mechanisms within a data communications device apparatus.

It is to be understood that the system of the invention can be embodied strictly as a software program, as software and hardware, or as hardware alone.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to methods and mechanisms that improve the accuracy of selecting an optimal slave server to respond to a client request for content. Upon receipt of a client request for content, a master server timestamps the arrival time of the client request for content. The timestamp serves as a basis for a transmit identifier that can be used later by one or more slave servers to know when to initiate delivery of a response to a client request for content to the requesting client.

In one embodiment of the invention, both the master server and slave servers are time synchronized using any one or more of a variety of methods such as a NTP (network time protocol configured to synchronize among the servers directly), GPS (global positioning system), clock times distributed by cell phone, television/radio signals, or other synchronization methods, etc. that tightly time-couple the master server and slave servers to each other.

The master server calculates a predetermined delay time, or utilizes a fixed delay time as a predetermined delay time. The master server can use one of many different methods to arrive at a predetermined delay time. One method is to create a predetermined delay that is based on the maximum delivery time for delivering a response to a client request for content from the master server to the slave servers.

Both the timestamp and the predetermined delay are used to create a transmit identifier in response to receipt of a client request. In turn, the master server forwards the transmit identifier and the associated client request to slave servers, where the individual slave servers use the transmit identifier as the starting time to deliver a response to a client request for content to the requesting client. Accordingly, the slave servers are able to send a response to a client request for content to the client using the same starting time as other slave servers, more accurately than would otherwise be possible. As a consequence, the slave server sending a requested response to a client request for content that reaches the client first, is actually the closest and/or fastest slave server for transmitting a response to a client request for content to the client.

In one embodiment of the invention, the client may be bound to the slave server identified as the fastest slave server for transmission of request responses, for a limited time period. Accordingly, the same path may be relied on to provide further responses either as a result of the initial request or as a result of additional requests from the same client. In other situations, the identified slave server may not directly respond to client requests. For example, the selected slave server may be a special purpose server that is representing a particular site, cluster, or group etc. of servers from which the client will actually be served.

Figure 1:
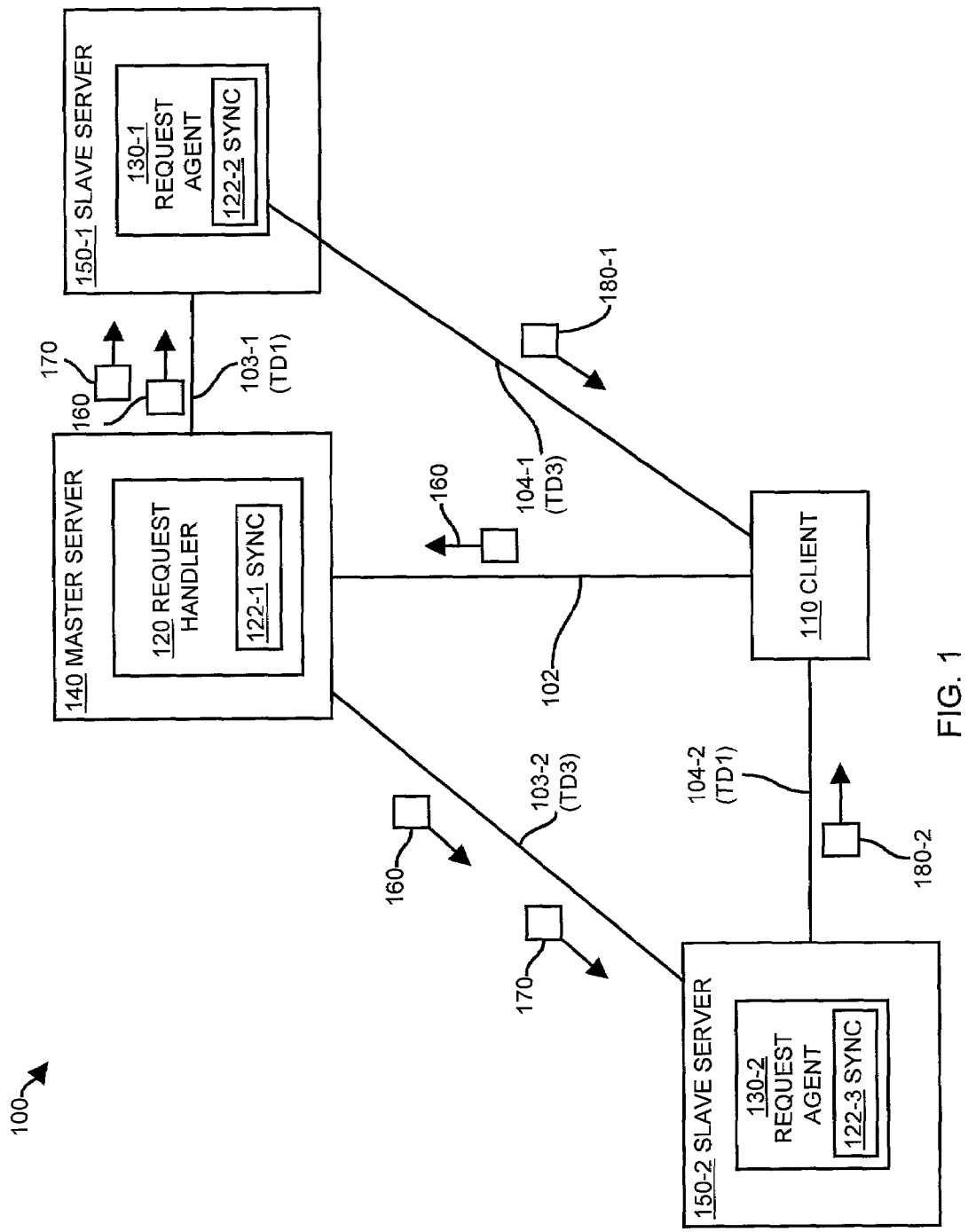
FIG. 1 is a system which is suitable for use in explaining operation of embodiments of the invention.

FIG. 1 is an environment 100 which is suitable for use in explaining operations of embodiments of the invention. FIG. 1 shows a coupling of a client 110, a master server 140 having a request handler 120, and one or more slave servers 150-1, 150-2, etc. having request agents 130-1, 130-2, etc. The master server 140 and slave servers all have synchronization clocks 122-1, 122-2, 122-3. FIG. 1 also shows messages traveling between the client 110, the master server 140 and the slave servers 150 which include a client request 160, a transmit identifier 170 and a response to requested content 180.

FIG. 1 also shows relative transmission delays (TD) time between the master server 140 and slave servers 150-1, 150-2 which are 103-1 and 103-2 (e.g., the example times are one second and three seconds, i.e., TD1 and TD3 respectively), the transmission delay time between the slave servers 150-1, 150-2 and the client 110 which are 104-1 and 104-2 (e.g., the example times are three seconds and one second, i.e., TD3 and TD1 respectively).

The transmission delays depicted, provide an example of the effect of the relative transmission times between the master server and different slave servers for messages (e.g. such as packets) containing a client request and transmit identifier with respect to how they affect the messages traveling between the slave servers and client in the process of providing the responses to client requests for content. An example is discussed in more detail later that demonstrates the effect of controlling the start of transmission and processing between the different slave servers and the client by using transmit identifiers, thereby reducing the effect of the differing transmission times between the master server and slave servers and it's effect on picking the fastest method of transmission and processing between different slave servers and the client.

Figure 2:
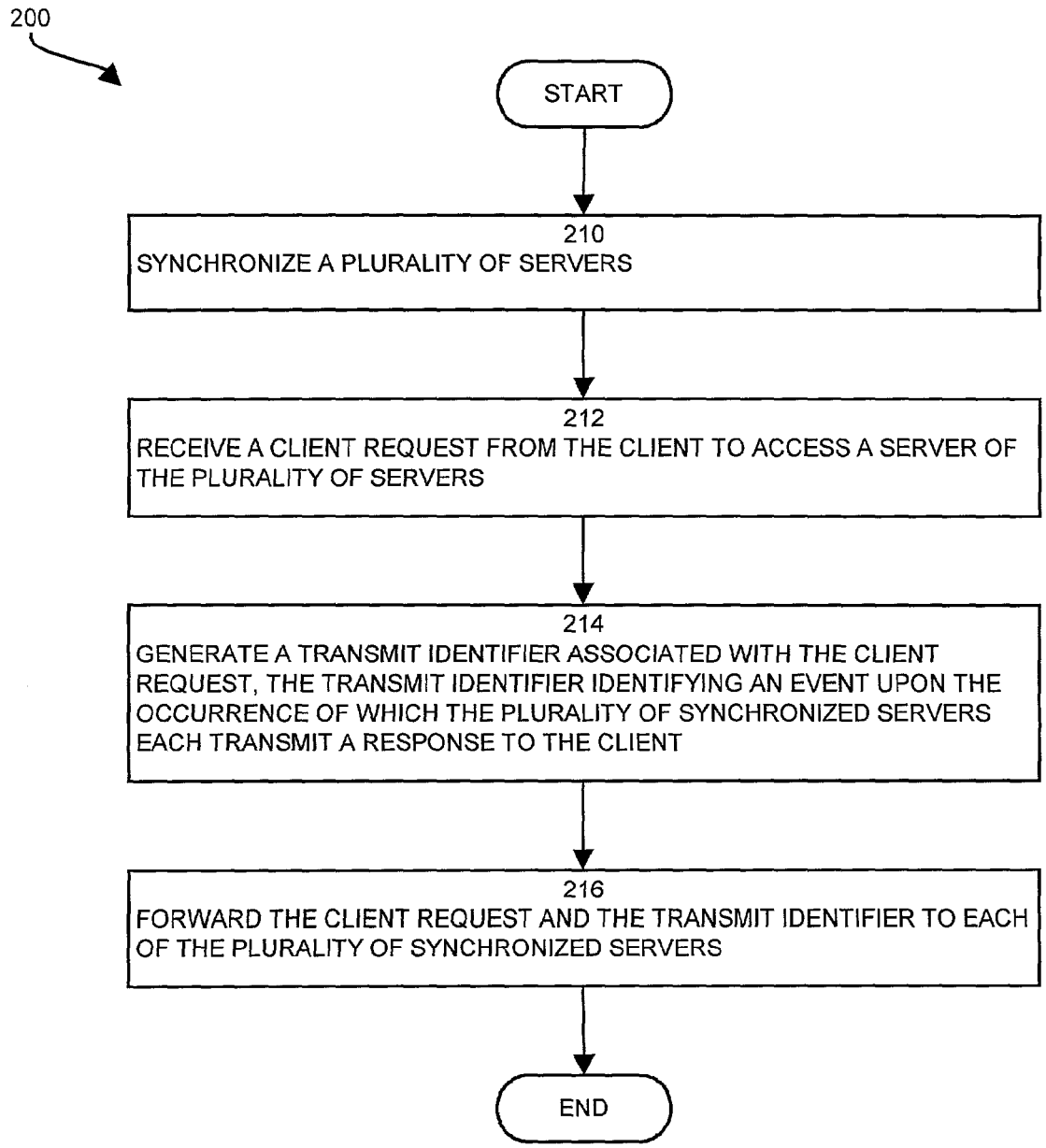
FIG. 2 is a flow chart of a procedure performed by the master server according to one embodiment of the invention.

Further details of the invention will now be provided with respect to FIG. 2.

FIG. 2 is a flow chart of a procedure performed by the master server 140 according to one embodiment of the invention.

In step 210, the master server 140 (e.g., server) synchronizes a plurality of slave servers (e.g., servers). The master server 140 and slave servers 150 are synchronized so that multiple slave servers 150 can be coordinated to transmit a response to a client request for content 180 simultaneously.

In step 212, the master server 140 receives a client request 160 from the client 110 to access a server 150 of the plurality of servers 150. It is not necessary that the client 110 be aware of the servers (slave servers 150). Upon receipt of the client request 160, the master server 140 will transmit request(s) 160 to the slave server(s) 150.

In step 214, the master server 140 generates a transmit identifier 170 associated with the client request 160. The transmit identifier 170 identifies an event upon the occurrence of which the synchronized servers 150 each transmit a response 180 to the client 110. A predetermined delay as will be explained shortly is added to a timestemp which the master server 140 generates in order to create a transmit identifier 170. Using the transmit identifier 170, multiple slave servers 150 are able to independently transmit responses to client requests to the client 110 upon the occurrence of a time event indicated by synchronization clocks 122-2, 122-3 operated by the slave servers 150.

In step 216, the master server 140 forwards the client request 160 and the transmit identifier 170 to each of the plurality of synchronized servers 150. Upon receipt of the client request 160 the master server 140 duplicates the client request 160, forwarding the client request 160 to multiple slave servers 150. One or more slave servers 150 will actually return a response 180 to the client request 160 for content.

Figure 3:
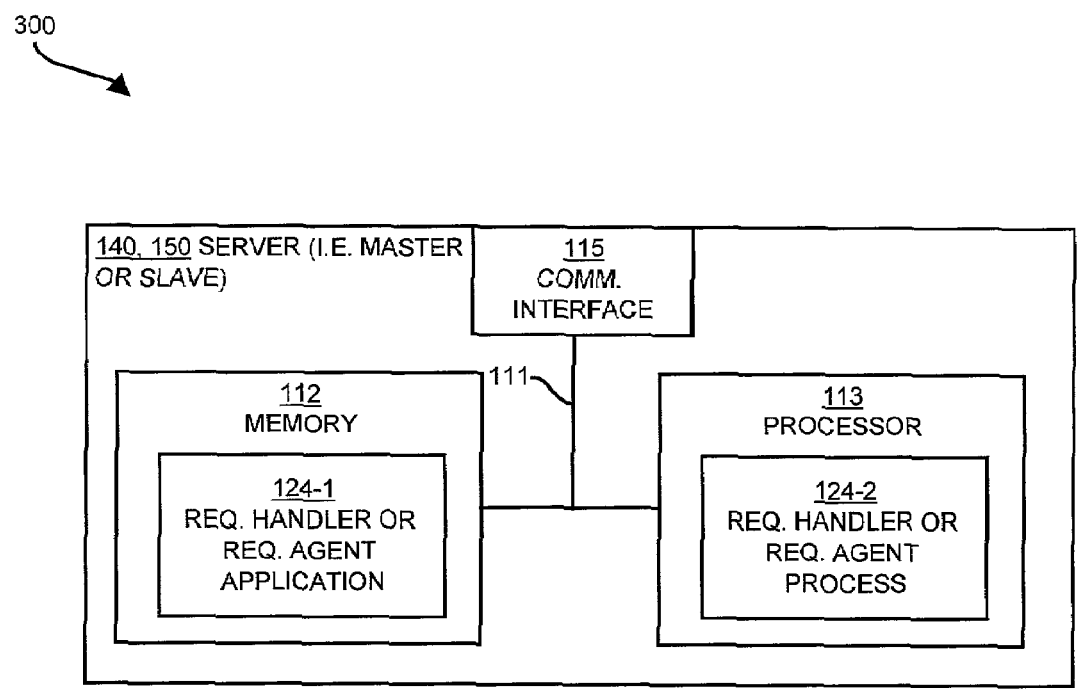
FIG. 3 shows an embodiment of the invention which is implemented using a general purpose computer.

Further details of embodiments of the invention will now be provided with respect to FIG. 3.

FIG. 3 shows an example embodiment of the invention which is implemented using a general purpose computer 300. The server (i.e., master server 140 or slave server 150) includes an interconnection mechanism 111 (e.g., a data bus and/or circuitry) which couples a communications interface 115 (e.g., modem or other network interface), a memory 112 (e.g., any computer readable medium such as a random access memory (RAM) and/or read only memory (ROM) or even disk or storage medium) having a request handler (for the master server 140) or request agent (for slave server 150) application 124-1, and a processor 113 (microprocessor or other central processing unit) with a request handler (for the master server 140) or request agent (for slave servers 150) process 124-2. The server 140, 150 may be any type of computerized device or system such as a personal computer, workstation, server, networked system, or lager mainframe system, data communications device, switch, router, hub, etc. The communications interface 115 allows either the master server 140 or slave server 150 to communicate with other servers and the client 110 via a network. The general purpose computer embodiment of the invention performs the same procedures as those described in more detail with respect to FIGS. 1–2 and 4–7.

Figure 4:
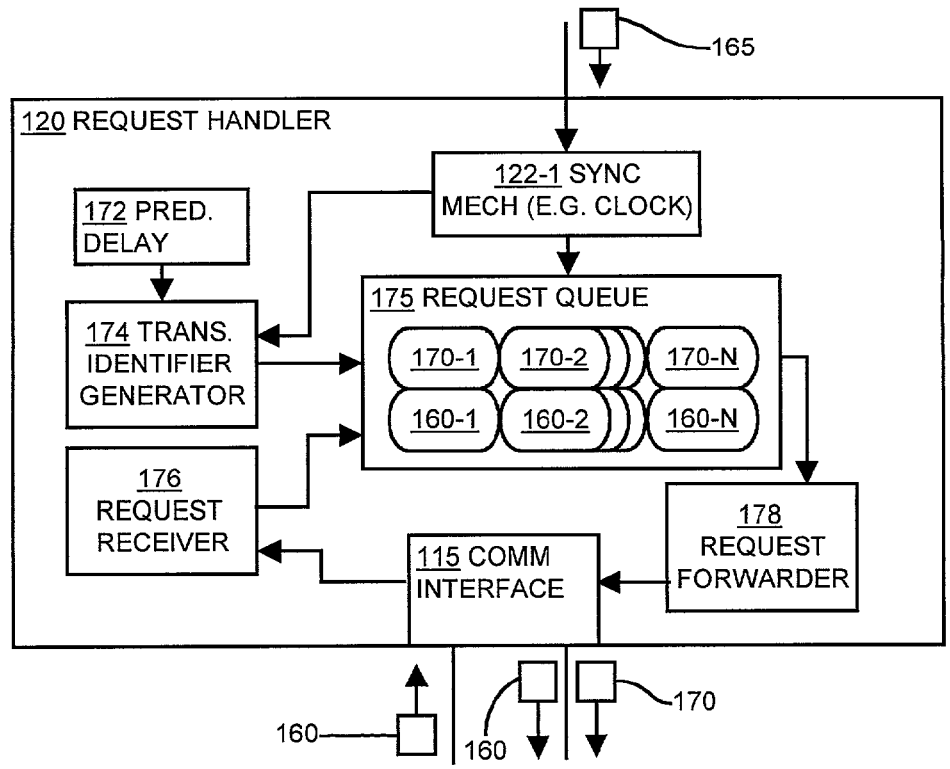
FIG. 4 depicts the various components of a request handler according to one embodiment of the invention.

Further details of the invention will now be provided with respect to FIG. 4.

FIG. 4 depicts the various components of request handler operations in a master server 140 and a data flow of requests 160 and transmit identifiers 170. The request handler 120 includes a transmit identifier generator 174, a request receiver 176, a synchronization clock 122-1, a request queue 175 which holds a multiple of client requests 160-1 to 160-N and transmit identifiers 170-1 to 170-N, a request forwarder 178, and a communications interface 115. FIG. 4 also shows a predetermined delay 172, a time synchronization signal 165, and a client request 160.

In this embodiment, the request handler 120 process operating in the master server 140 combines a timestamp and predetermined delay 172 to create a transmit identifier 174. The transmit identifier 174 may be added to a queue of other transmit identifiers 174 associated with responsive client requests 160 and are forwarded to slave servers 150 for later processing. Further details of the invention will now be provided with respect to FIG. 5.

Figure 5:
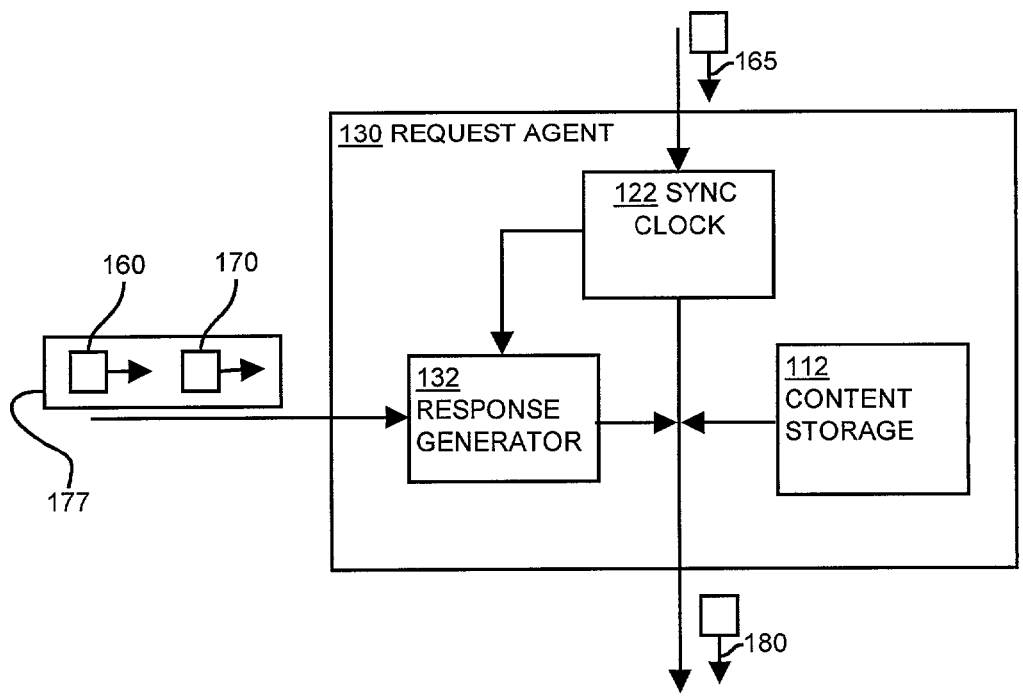
FIG. 5 depicts the various components of a request agent according to one embodiment of the invention.

FIG. 5 depicts the various components of a request agent 130 operating in a slave server 150. The request agent 130 includes a synchronization clock 122, a response generator 132 and a content storage device 112. FIG. 5 also shows a synchronization signal 165, a transmit identifier 177 having a client request 160, transmit identifier 170 and a response to a client request for content 180.

Each request agent process 130 in each slave server 150 receives client requests 160 and transmit identifiers 170 (e.g., these may be combined into a single packet 177 or may be forwarded separately) from the master server 140. Upon the occurrence of a time event from the synchronization clock 122, as identified in the transmit identifier 170, the request agent process 130 in each slave server 150 transmits a response to the client for the requested content 180 to the client 110.

Figure 6:
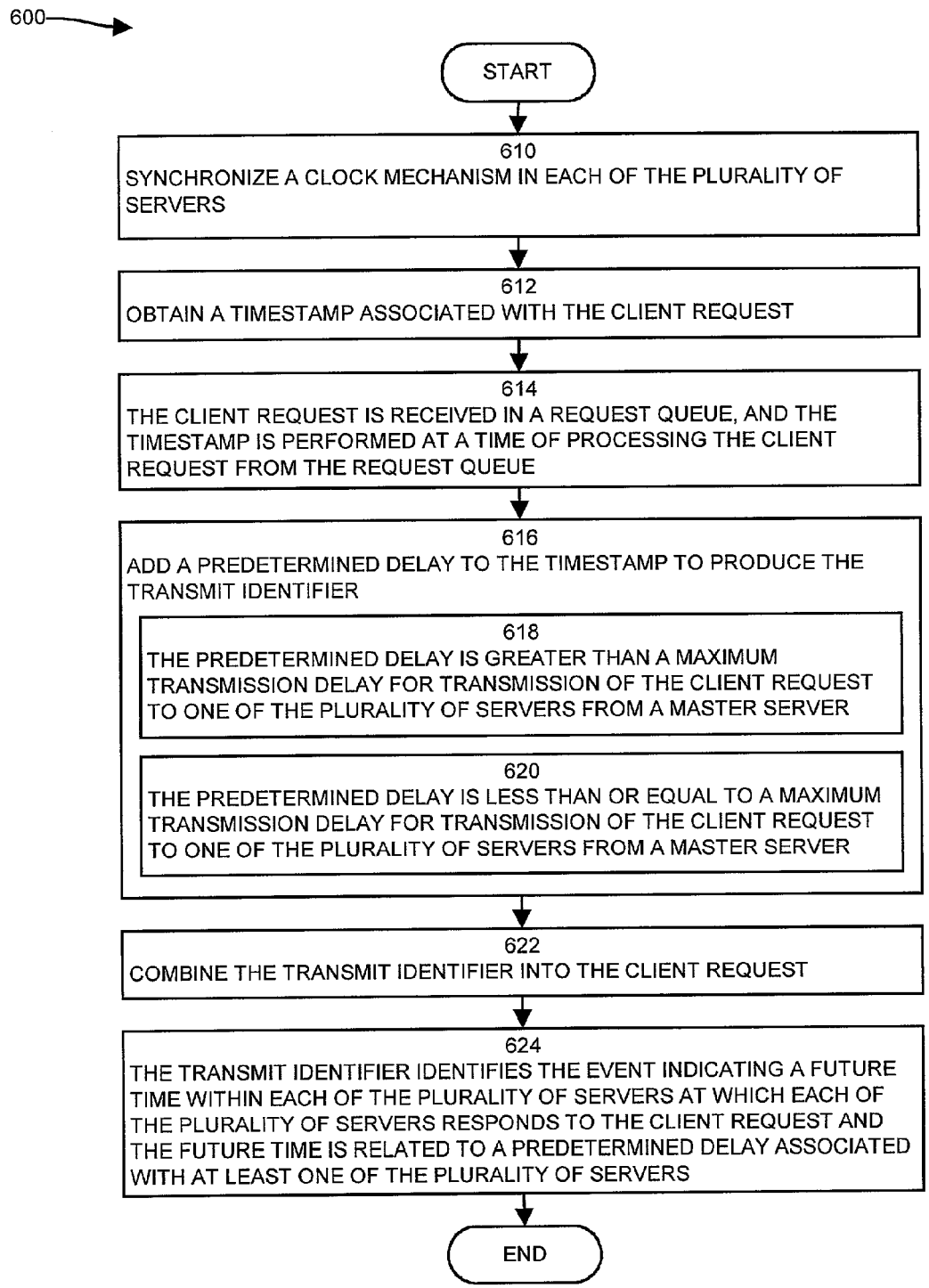
FIG. 6 is a flow chart showing additional detail of a procedure performed by the master server according to one embodiment of the invention.

Further details of the invention will now be provided with respect to FIG. 6.

FIG. 6 is a flow chart showing additional detail of a procedure performed by one embodiment of the master server 140. In step 610, the server (e.g., master server 140 and slave servers 150) synchronize a clock mechanism 122 in each of the plurality of servers (e.g., master server 140 and slave servers 150). There are various ways to time synchronize servers (e.g., the master server 140 and slave servers 150). One method is to provide a time synchronization signal (See FIG. 4,165) from an independent source to each server (e.g., the master server 140 and slave servers 150). NTP (network time protocol) is another methodology capable of providing time synchronization with respect to the servers 140, 150. Although, in one embodiment of the invention, a standard NTP configuration may be used, in which NTP is configured to simply subscribe to a local or remote time server, in another embodiment of the invention, NTP is configured to exchange time synchronization signals directly among the participating master and slave servers.

Components of GPS (e.g., global positioning system), radio signals, cellular telephone systems signals and other methods and mechanisms known by individuals with ordinary skill in the art, may also be employed to provide time synchronization to the master server 140 and slave servers 150.

In step 612, the master server 140 obtains a timestamp associated with the client request 160. The timestamp creates an arbitrary point in time that can be used as a basis for initiating events that are undertaken by the slave servers 150. By obtaining a timestamp and later adding a predetermined delay 172 to the timestamp that is forwarded to all of the slave servers 150, and which can be used to identify a time event that is consistent in all of the slave servers 150 (e.g., as a result of the synchronization of the clocks operating in the slave servers 150), the time servers are enabled to simultaneously transmit responses to a client request for content 180 to the client 110.

In one embodiment, the master server 140 obtains a timestamp upon receipt of the client request 160. A timestamp may be generated at the time of reception of the client request 160. The master server 140 may alternatively be configured to timestamp the content request 160 at a later time. For example, the timestamp may be generated at the time of processing the client request 160 or at the time of forwarding the content request 160 to the slave server 150.

In step 614, the client request 160 is received in a request queue 175, and the timestamp is performed at a time of processing the client request 160 from the request queue 175. In the case of some configurations of master servers 140, client requests 160 are collected in a request queue 175. In such master servers 140, content requests 160 that are not able to be immediately processes are queued for later processing. Such a configuration allows for better utilization of master server 140 resource capacity without any loss of client requests 160 or delay by the master server 140 in the acceptance of client requests 160.

In step 616, the master server 140 adds a predetermined delay 172 to the timestamp to produce the transmit identifier 170. The master server 140 calculates a predetermined delay time 172, or utilizes a fixed delay time as a predetermined delay 172. The master server 140 can use any of several different methods to arrive at a predetermined delay time. Two such methods are described in steps 618 and 620 below.

In step 618, the predetermined delay 172 is greater than a maximum transmission delay for transmission of the client request 160 to one of the plurality of servers 150 from a master server 140. Use of this method guarantees that every slave server 150 that may be the fastest slave server 150, has an opportunity for a response to a client request for content sent by that slave server 150 to reach the client 110 before a response to a client request for content 180 sent by another slave server 150. Otherwise it is possible that a slave server 150 that is far from the master server 140 may not have the opportunity to transmit a response to a client request for content 180 to the client 110 before a response to a client request for content 180 reaches the client 110 first, from another slave server 150.

In step 620, the predetermined delay 172 is less than or equal to a maximum transmission delay for transmission of the client request 160 to one of the plurality of servers 150 from a master server 140. One approach to using a predetermined delay 172 that is less than the maximum transmission delay is to chose a predetermined delay 172 that balances the likelihood of including the fastest available slave server 150 against the actual transmission delay experienced as a result the predetermined delay 172 time chosen.

Other methods of choosing a predetermined delay 172 include using a mathematical distribution or formula, or an actual network transmission test, an experimentally determined value or other known traffic information to pick a effective predetermined delay 172 that is less than the maximum delivery time from the master server 140 to the slave servers 150.

The method of calculating a predetermined delay 172 can also take into consideration the probability of slave servers being able to deliver a response to a client request for content 180 to a client more quickly than the delivery time that exists between the master server 140 and slave servers 150. Using the probability based calculation may result in optimization of the request/response delivery time.

By combining the timestamp with a predetermined delay 172 to create a transmit identifier 170 which the master server 140 can send to the slave servers 150, the master server 140 thereby provides the slave servers 150 with a time value that the slave servers 150 can use to initiate delivery of a response to a client request for content 180 to the client 110. Once reaching the slave servers 150, the transmit identifier 170, can be compared to the time events provided by the synchronization clock 122 operating on the slave server 150. The slave server 150 identifies a time to start delivery (e.g., which is synchronized with the delivery of a response to a client request for content 180 by other slave servers) of a response to a client request for content 180 requested by the client 110. Accordingly, the first response to a client request for content 180 to reach the client 110 turns out to be a response to a client request for content 180 that was sent by the fastest slave server 150 for proving the response to a client request for a response to a client request for content 180.

In step 622, the master server 140 combines the transmit identifier 170 into the client request 160. In some cases, rather than send a client request 160 and a transmit identifier 170 to the slave servers 150 as separated messages, the master server 140 may insert the timestamp and predetermined delay 172 information which make up a transmit identifier 170 into the header of the client request 160 creating a combined message 177. In some cases, this approach can result in more efficient transmission and/or a reduction of processing overhead required to transmit client requests 160 and transmit identifiers 170.

In step 624, the transmit identifier 170 identifies the event indicating a future time within each of the plurality of servers 150 at which each of the plurality of servers 150 responds to the client request 160 and the future time is related to a predetermined delay 172 associated with at least one of the plurality of servers 140,150. As described earlier, each slave server 150 compares received transmit identifiers 170 to the output of a synchronization time clock 122 which has been synchronized to the synchronization time clock 122 of the master server 122-1 and the synchronization time clock of one or more other slave servers 122 etc. Upon the occurrence of the time event provided by the synchronization time clock 122, which is the equivalent of a time event defined by a transmit identifier 170, the slave server 150 transmits the response to a client request for content 180 which the client 110 originally requested. At that point, duplicate response to a client request for content 180 from multiple slave servers are in a race to reach the client 110 first. Although, in some cases, the content 180 received may fulfill initial client request 160, there may be additional requests 160, as well. In one embodiment of the invention, future requests 160 may be bound to the slave server 150 identified as the fastest slave server 150 for a limited time period.

An example will help illustrate how the procedure, as described, operates to eliminate the effect of the time that transpires as content requests 160 are transmitted from the master server 140 to a multiple of slave servers 150 in the race content transmitted to the client 110. In the example there is a one second time delay 103-1 (i.e., TD1) for delivery of a client request 160 from the master server 140 to the slave server 150-1. In addition, there is a 3 second delay time 104-1 (i.e., TD3) for delivery of the response to a client request for content 180-1 by the slave server 150-1 to the client 110. The total time delay for the two legs is 4 seconds. With respect to the other slave server 150-2, the time delay for transmission of the client request 160 between the master server 140 and slave server 150-2 is 3 seconds 103-2 (TD3) and the time delay for transmission of the response to a client request for content 180-2 between the slave server 150-2 an the client 110 is one second 104-2 (TD1). The total time delay for the two legs is 4 seconds. As described earlier, there are different options for calculation of the predetermined delay 172 that is to be added to the synchronization clock 122-1 timestamp in order to create the transmit identifier 170.

Assume, for the example, that the predetermined delay 172 is the maximum delay for the delivery time between master server 140 and slave servers 150 or 3 seconds. Therefore, upon the occurrence of a 3 second time delay observed by the synchronization clocks 122-2, 122-3, the two slave servers 150-1, 150-2 simultaneously transmit the requested response to a client request for content 180-1, 180-2, to the client 110. In this case, the response to a client request for content 180-2 transmitted by one of the slave servers 150-2, would reach the client 110 after a time delay of 1 second additional time delay. The response to a client request for content 180-1 delivered by slave server 150-1 would reach the client 110 after a 3 second time additional time delay from the time that the slave server 150-1 transmits the response to a client request for content 180-1 (e.g., two seconds after the arrival of the response to a client request for content 180-2, sent by the other slave server 150-2). The response to a client request for content 180 from the fastest slave server 150-2 would be accepted by the client 110. The later-received response to a client request for content 180-1 from the other slave server 150-1 would be rejected by the client 110. In the example, a response to a client request for content 180-2 from the closer slave server 150-2 reaches the client 110 first (e.g., 2 seconds before the response from a client request for content 180-1 from the other slave server 150-1).

Figure 7:
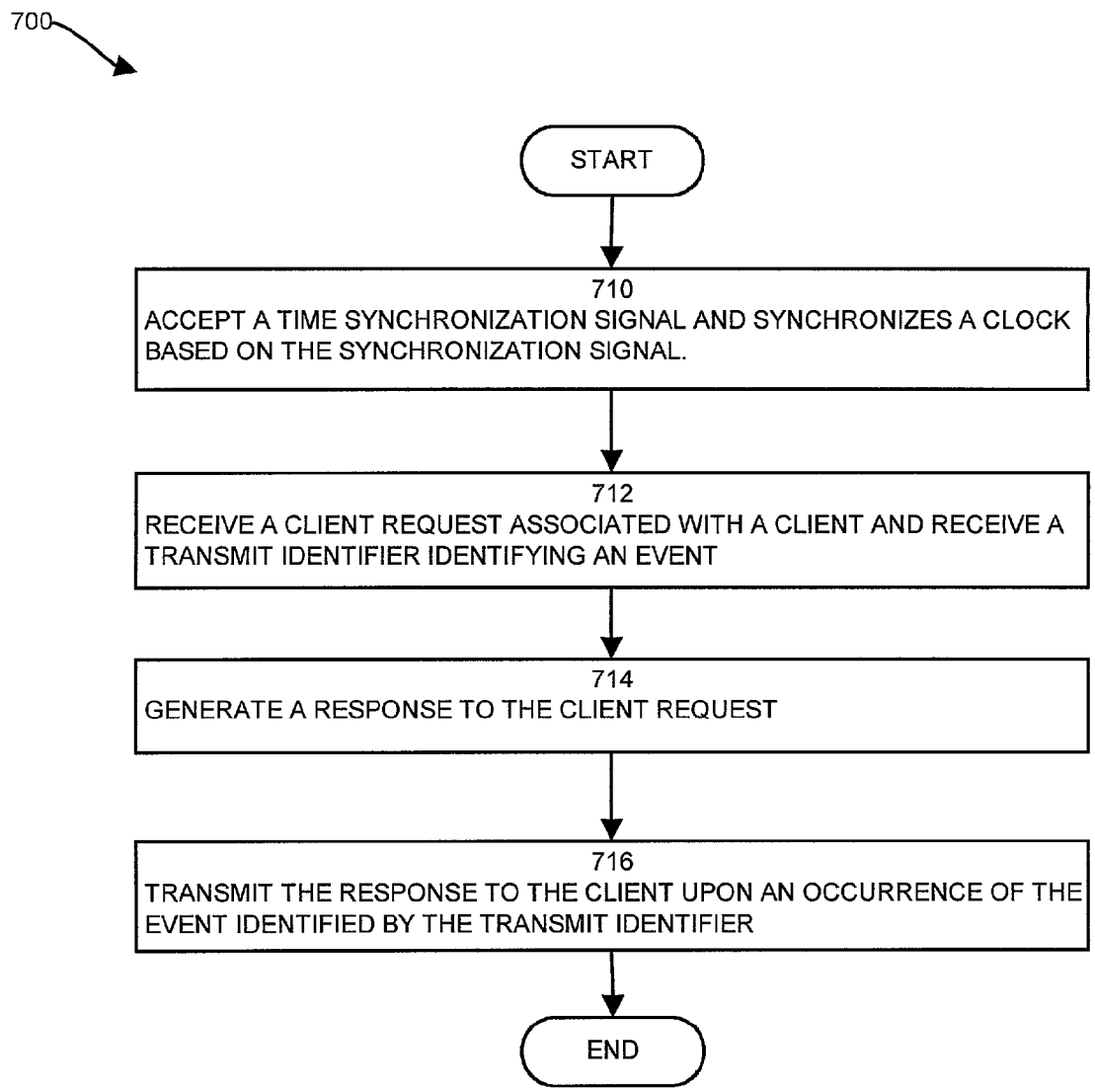
FIG. 7 is a flow chart of a procedure performed by the slave server according to one embodiment of the invention.

Further details of the invention will now be provided with respect to FIG. 7.

FIG. 7 is a flow chart of a procedure performed by the slave server 150.

In step 710, the slave server 150 accepts a time synchronization signal 165 and synchronizes a clock 122 based on the synchronization signal 165. The time synchronization signal 165 insures that the time synchronization clocks 122 operating on the servers (e.g., master server 140 and slave servers 150) are in sync and are therefore generating the same time. Various sources can be used as a signal to synchronize time synchronization clocks 122 located in the various servers (e.g., master server 140 and slave servers 150) to each other. Some examples include signals used by the NTP (e.g., network time protocol), television, radio and cellular telephone time signals, etc. The synchronization signals 165, used in conjunction with the synchronization clocks located on servers (e.g., master server 140 and slave servers 150), enable the slave servers 150 to simultaneously initiate actions, based on the occurrence of a time event provided by the synchronization clocks 122. In this case, synchronization of the servers (e.g., master server 140, slave servers 150) enable the slave servers 150 to transmit a requested response to a client request for content 180 simultaneously.

In step 712, the slave server 150 receives a client request 160 associated with a client 110 and receives a transmit identifier 170 from the master server 140, identifying an event.

In step 714, the slave server 150 generates a response 180 to the client request for content 160 and transmits the response 180 to the client 110 upon an occurrence of the event identified by the transmit identifier 170. As described earlier, the slave server 150 compares received transmit identifiers 172 to the output of a synchronization time clock 122 that has been synchronized to the time clock 122-1 of the master server and the synchronization time clock 122 of one or more other slave servers. Upon the occurrence of the time event provided by the synchronization time clock 122, which is the equivalent of a time event defined by a transmit identifier 170, the slave server 150 transmits the response to a client request for content 180 which the client 110 originally requested. Multiple slave servers 150 are thereby caused to transmit duplicate copies of the requested response to a client request for content 180 to the client 110.

While this invention has been particularly shown and described with references to preferred embodiments thereof, it will be understood by those skilled in the art that various changes in form and details may be made therein without departing from the spirit and scope of the invention as defined by the appended claims.

For example, networks consist of data communications devices such as routers, bridges, switches, access servers, gateways, hubs, concentrators, proxy servers, repeaters and so forth which exchange data over an interconnection of data links. These may be physical connections or may also be provided using wireless communication mechanisms. Physical data communications connection mechanisms can include modems, transceivers, network interface cards, fiber optic cards, ports and other hardware devices and many others which allow data to be transferred at various data transfer rates (i.e., bandwidth) to and from the host and between data communications devices.

In addition, master servers and slave servers may exist in various configurations including, among other, master and slave servers that perform multiple or combined functions in addition to those described here. Furthermore, the figures used to represent various embodiments of the invention, herein, show a configuration consisting of one master server and two slave servers. The configuration is offered for ease of explaining the operation of the embodiments of the invention. It should be understood, that the embodiments of the invention can also have different configurations and numbers of master and/or slave servers as well.

The method and mechanisms described herein can be used to provide a response to a client request for content 180 from the fastest of multiple slave servers operating in various different situations and different environments. For example, in one situation the response to a client request for content 180 may be DNS (e.g., domain name service) information. Accordingly, in that situation, a client 110 requests DNS information. A master server distributes the request for DNS information to multiple DNS proxy servers (e.g., operating as slave servers) which fulfill client requests 160 based on the timing provided by a transmit identifier 170 used in conjunction with the synchronization clock 122. Upon the occurrence of the transmit identifier 172 identified timing event the multiple proxy servers return the requested DNS information to the client 110 which accept the first transmission received from the fastest proxy server. In effect, the DNS proxy request 160 embodiment of the invention works in a parallel fashion to that of a client request 160 information such as text, web pages, multimedia, etc.

In alternate embodiments, different transmission protocols can employ the techniques and mechanisms described herein as well. For example, a master server 140 may be configured to receive TCP/IP or UDP client request 160 packets from a client 110 and transmit duplicates of the client request 160 to multiple slave servers 150 along with the transmit identifier 172, as described earlier. The slave servers 150 may be configured to, in turn, after receipt of the client request 160 and upon the occurrence of the timing event defined by the transmit identifier 170, transmit the appropriate response packet 180. In the case of TCP or UDP transmissions, the packet types and sequence numbers transmitted by slave servers enable the client 110 to identify if packets that the client 110 has received are packets that have been the first to be received or are duplicate packets that have been received later. The various embodiments of the invention can be used in conjunction with other transmission protocols as well.

The features of the invention may be employed in data communications device and other computerized devices such as those manufactured by Cisco systems, Inc. of San Jose, Calif.

What is claimed is:

1. A method for responding to a client request, the method comprising the steps of:

synchronizing a plurality of servers;

receiving a client request from the client to access a server of the plurality of servers;

generating a transmit identifier associated with the client request, the transmit identifier identifying an event upon the occurrence of which the plurality of synchronized servers each transmit a response to the client, wherein said transmit identifier includes a timestamp reflecting an arrival time of the client request, wherein a predetermined delay is added to the timestamp to produce the transmit identifier, wherein the predetermined delay is greater than a maximum transmission delay for transmission of the client request to one of the plurality of servers from a master server and wherein the transmit identifier is associated with the client request; and forwarding the client request and the transmit identifier to each of the plurality of synchronized servers.

2. The method of claim 1 wherein the step of synchronizing comprises the steps of:

synchronizing a clock mechanism in each of the plurality of servers.

3. The method of claim 1 wherein the step of associating the transmit identifier comprises the step of:

combining the transmit identifier into the client request.

4. The method of claim 1 wherein the step of obtaining the timestamp is performed upon receipt of the client request.

5. The method of claim 1 wherein the client request is received in a request queue, and wherein the step of obtaining the timestamp is performed at a time of processing the client request from the request queue.

6. The method of claim 1 wherein the transmit identifier identifies the event indicating a future time within each of the plurality of servers at which each of the plurality of servers responds to the client request; and wherein the future time is related to a predetermined delay associated with at least one of the plurality of servers.

7. The method of claim 1 wherein the step of generating the transmit identifier includes adding a predetermined delay to the timestamp to produce the transmit identifier, and combining the transmit identifier with the client request, wherein the client request is received in a request queue, wherein the step of obtaining the timestamp is performed at a time of processing the client request from the request queue, and wherein the transmit identifier identifies the event indicating a future time within each of the plurality of servers at which each of the plurality of servers responds to the client request, and wherein the future time is related to a predetermined delay associated with at least one of the plurality of servers.

8. A method for responding to a client request, the method comprising the steps of:

receiving a client request associated with a client and receiving a transmit identifier identifying an event, wherein said transmit identifier includes a timestamp reflecting an arrival time of the client request and wherein a predetermined delay is added to the timestamp to produce the transmit identifier, wherein the predetermined delay is greater than a maximum transmission delay for transmission of the client request to one of the plurality of servers from a master server and wherein the transmit identifier is associated with the client request;

generating a response to the client request; and transmitting the response to the client upon an occurrence of the event identified by the transmit identifier.

9. The method of claim 8 further including the step of:

accepting a time synchronization signal; and synchronizing a clock based on the synchronization signal.

10. A master server for handling content requests comprising:

a memory;

a communications interface;

a processor; and an interconnection mechanism coupling the memory, the processor and the communications interface;

wherein the memory is encoded with a request handler application that when performed on the processor, produces a request handler process that causes the master server to provide a client request and transmit identifier in response to a client request such that the processor is configured to:

synchronize a plurality of servers;

receive a client request from the client to access a server of the plurality of servers;

generate a transmit identifier associated with the client request, the transmit identifier identifying an event upon the occurrence of which the plurality of synchronized servers each transmit a response to the client, and wherein said transmit identifier includes a timestamp reflecting an arrival time of the client request, wherein a predetermined delay is added to the timestamp to produce the transmit identifier, wherein the predetermined delay is greater than a maximum transmission delay for transmission of the client request to one of the plurality of servers from a master server and wherein the transmit identifier is associated with the client request; and forward the client request and the transmit identifier to each of the plurality of synchronized servers.

11. The master server of claim 10 wherein, to synchronize a plurality of servers, the master server is configured to:

synchronize a clock mechanism in each of the plurality of servers.

12. The master server of claim 10 wherein, to associate the transmit identifier, the master server is configured to:

combine the transmit identifier into the client request.

13. The master server of claim 10 wherein the master server is configured to obtain the timestamp upon receipt of the client request.

14. The master server of claim 10 wherein the master server is configured such that the client request is received in a request queue, and wherein the master server obtains the timestamp at a time of processing the client request from the request queue.

15. The master server of claim 10 wherein the master server is configured such that the transmit identifier identifies the event indicating a future time within each of the plurality of servers at which each of the plurality of servers responds to the client request; and wherein the future time is related to a predetermined delay associated with at least one of the plurality of servers.

16. The master server of claim 10 wherein the master server is configured such that the predetermined delay is less than or equal to a maximum transmission delay for transmission of the client request to one of the plurality of servers from a master server.

17. A slave server for handling content requests comprising:

a memory;

a communications interface;

a processor; and an interconnection mechanism coupling the memory, the processor and the communications interface;

wherein the memory is encoded with a request agent application that when performed on the processor, produces a request agent process that causes the slave server to provide content to a client, in response to a client request and a transmit identifier, such that the processor is configured to:

receive a client request associated with a client and receiving a transmit identifier identifying an event, and wherein said transmit identifier includes a timestamp reflecting an arrival time of the client request, wherein a predetermined delay is added to the timestamp to produce the transmit identifier, wherein the predetermined delay is greater than a maximum transmission delay for transmission of the client request to one of the plurality of servers from a master server and wherein the transmit identifier is associated with the client request;

generate a response to the client request; and transmit the response to the client upon an occurrence of the event identified by the transmit identifier.

18. The slave server of claim 17 wherein, the slave server is further configured to:

accept a time synchronization signal; and synchronize a clock based on the synchronization signal.

19. A system for identifying a server that provides the fastest response to a client request comprising:

a master server, which is configured to (i) receive a client request from the client to access a server of a plurality of slave servers, (ii) generate a transmit identifier associated with the client request, the transmit identifier identifying an event upon the occurrence of which the plurality of synchronized servers each transmit a response to the client, and wherein said transmit identifier includes a timestamp reflecting an arrival time of the client request, wherein a predetermined delay is added to the timestamp to produce the transmit identifier, wherein the predetermined delay is greater than a maximum transmission delay for transmission of the client request to one of the plurality of servers from a master server and wherein the transmit identifier is associated with the client request and (iii) forward the client request and the transmit identifier to each of the plurality of synchronized servers; and a slave server, which is configured to (i) receive a client request associated with a client and receive a transmit identifier identifying an event (ii) generate a response to the client request, and transmit the response to the client upon an occurrence of the event identified by the transmit identifier.

20. A computer program product having a computer-readable medium including computer program logic encoded thereon that, when performed on a processor in a computerized device having a coupling of a memory, a processor, and at least one communications interface provides a method for providing a response to a client request by performing the operations of:

synchronizing a plurality of servers;

receiving a client request from the client to access a server of the plurality of servers;

generating a transmit identifier associated with the client request, the transmit identifier identifying an event upon the occurrence of which the plurality of synchronized servers each transmit a response to the client, and wherein said transmit identifier includes a timestamp reflecting an arrival time of the client request, wherein a predetermined delay is added to the timestamp to produce the transmit identifier, wherein the predetermined delay is greater than a maximum transmission delay for transmission of the client request to one of the plurality of servers from a master server and wherein the transmit identifier is associated with the client request; and forwarding the client request and the transmit identifier to each of the plurality of synchronized servers.

21. An apparatus for responding to a client request comprising:

a memory;

a communications interface;

a processor; and an interconnection mechanism coupling the memory, the processor and the communications interface;

wherein the memory is encoded with a request handler application that when performed on the processor, produces a means to enable the client request and transmit identifier to be forwarded to at least one slave server, such means including:

means for synchronizing a plurality of servers;

means for receiving a client request from the client to access a server of the plurality of servers;

means for generating a transmit identifier associated with the client request, the transmit identifier identifying an event upon the occurrence of which the plurality of synchronized servers each transmit a response to the client, and wherein said transmit identifier includes a timestamp reflecting an arrival time of the client request, wherein a predetermined delay is added to the timestamp to produce the transmit identifier, wherein the predetermined delay is greater than a maximum transmission delay for transmission of the client request to one of the plurality of servers from a master server and wherein the transmit identifier is associated with the client request; and means for forwarding the client request and the transmit identifier to each of the plurality of synchronized servers.

* * * * *